(12) United States Patent
Kauffman (10) Patent No.: US 7,690,822 B2
(45) Date of Patent: Apr. 6, 2010

(54) SWIVEL JOINT FOR LIGHTING FIXTURE

(75) Inventor: Rick W Kauffman, Buford, GA (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 12/021,777

(22) Filed: Jan. 29, 2008

(65) Prior Publication Data

US 2009/0190365 A1 Jul. 30, 2009

(51) Int. Cl.
*F21S 8/08* (2006.01)

(52) U.S. Cl. .................. 362/418; 362/413; 362/275

(58) Field of Classification Search ............ 362/147, 362/269, 270, 275, 285, 372, 373, 410, 413, 362/414, 418–422, 427, 431, 449
See application file for complete search history.

(56) References Cited

U.S. PATENT DOCUMENTS

| 816,155 | A | | 3/1906 | Dean |
| 960,899 | A | | 6/1910 | Guyer |
| 1,475,867 | A | | 11/1923 | Peterson |
| 1,601,014 | A | * | 9/1926 | Wismer et al. ............ 362/386 |
| 1,605,507 | A | | 11/1926 | Burke |
| 1,697,710 | A | * | 1/1929 | Bostroem ................ 403/97 |
| 1,880,098 | A | | 9/1932 | Mair |
| 1,927,181 | A | * | 9/1933 | McRea ................ 362/275 |
| 2,178,240 | A | | 10/1939 | Pascale |
| 2,577,811 | A | | 12/1951 | Rutledge |
| 2,629,465 | A | | 2/1953 | Rhea |
| 2,632,660 | A | * | 3/1953 | Krauthamer ............. 403/53 |
| 2,910,310 | A | * | 10/1959 | Mulac ................ 285/91 |
| 3,355,847 | A | | 12/1967 | Pratt |
| 3,778,610 | A | * | 12/1973 | Wolf ................ 362/418 |
| 4,008,910 | A | * | 2/1977 | Roche ................ 285/153.1 |
| 4,386,393 | A | * | 5/1983 | Pike ................ 362/427 |
| 4,403,795 | A | | 9/1983 | Davlin |
| 4,437,690 | A | * | 3/1984 | Drath ................ 285/272 |
| 5,275,444 | A | * | 1/1994 | Wythoff ................ 285/90 |
| 5,624,198 | A | * | 4/1997 | Fuchs ................ 403/76 |
| 6,527,466 | B1 | | 3/2003 | Blier et al. |
| 6,957,832 | B1 | | 10/2005 | Pannekoek |

FOREIGN PATENT DOCUMENTS

| AU | 767949 | | 5/2001 |
| CA | 2386061 | | 4/2001 |
| DE | 3916667 A | * | 11/1990 |
| DE | 20303917 U1 | | 5/2003 |

* cited by examiner

*Primary Examiner*—Hargobind S Sawhney
(74) *Attorney, Agent, or Firm*—Hoffman & Bacon, LLP (57) ABSTRACT

A lighting fixture swivel joint for pivoting an upper conduit having a fixture head disposed at an upper end thereof downward with respect to a lower conduit generally includes an upper swivel joint member and a lower swivel joint member rotatably coupled to the upper swivel joint member about a plane of rotation. The upper swivel joint member includes an upper conduit receptacle defined by a longitudinal axis and being adapted to receive a lower end of the upper conduit, whereby the upper conduit is coaxially aligned with the longitudinal axis. The plane of rotation is disposed at an angle of between zero degrees (0°) and thirty degrees (30°) with respect to the longitudinal axis of the upper conduit receptacle of the upper swivel joint member.

16 Claims, 12 Drawing Sheets

SWIVEL JOINT FOR LIGHTING FIXTURE

BACKGROUND OF THE INVENTION

The present invention relates to lighting fixtures for industrial applications, and more particularly to a lighting fixture which is easily and safely accessed for servicing and repairs.

In industrial applications such as mining, processing plants or refineries, there are typically long runs of piping or conveyors from one building structure to another. Often there are elevated catwalks along these long runs for maintenance purposes. Lighting fixtures are typically mounted on the catwalks to provide illumination in dark areas and at night.

Typical methods for servicing or replacing components of such lighting fixtures involve use of a ladder to access the lighting fixture head, which is often supported more than eight to ten feet above the catwalk. Obviously, a danger exists for the maintenance worker precariously climbing a ladder supported on a catwalk high above the ground.

One known method for providing access to the light fixture head without use of a ladder is by incorporating a light fixture pole with a means to permit a top portion of the pole to pivot downward. For example, U.S. Pat. No. 6,957,832 to Pannekoek discloses a light fixture pole having an interconnect joint disposed at a forty-five degree angle to permit a top portion of the pole to pivot with respect to the bottom portion, thereby allowing a maintenance worker to access the lighting fixture head.

However, one problem with the disclosed pivot joint is that its geometry causes the lighting fixture head to be pivoted laterally beyond the catwalk, thereby requiring a maintenance worker to reach outwardly over the rail of the catwalk to access the head. Again, a danger exists for the maintenance worker, who needs to reach over the catwalk rail to access the light fixture head, Another drawback with conventional lighting fixtures is the number of tools typically required to service or replace components of the fixture. For example, removal of the fixture head from the mounting pole of a conventional lighting fixture may require one or more differently sized wrenches and screwdrivers to loosen and remove fixture hardware, which gives rise to another problem relating to loose hardware. Thus, a maintenance worker would typically need to carry a large tool chest or satchel along the catwalk in order to perform such tasks, and must also be careful not to drop or lose the hardware necessary to mount the lighting fixture head to the pole.

Still another consideration with lighting applications in industrial environments such as mining, processing plants or refineries is the requirement in certain hazardous installations that the lighting fixtures not produce any electrical arcs or sparks. In particular, disconnecting a live plug connection of a light fixture for servicing or repair, for example, could result in an electrical arc or spark, which must be prevented in a hazardous atmosphere for safety reasons.

One approach for addressing this safety issue is to terminate power at the source before disconnecting any lighting fixture wiring or plug connections. The drawback here is that a number of fixtures will typically be turned off at the same time during servicing of a single fixture, resulting in large areas of the facility not illuminated.

Another solution is to provide individual fixtures with on/off switches that must be manually actuated before servicing the fixture. This adds to the cost of the fixture itself, as well as the cost of installation. There also remains the possibility that the maintenance worker inadvertently fails to activate the switch before making any electrical disconnections.

Accordingly, it would be desirable to provide a lighting fixture for mounting on a catwalk that is safely and easily accessible by a maintenance worker standing on the catwalk. It would be further desirable to provide a lighting fixture that can be serviced and repaired without the need for tools and with minimal risk of losing lighting fixture mounting hardware. It is still further desirable to provide a safe lighting fixture that will automatically electrically disconnect upon initiation of servicing or repair.

SUMMARY OF THE INVENTION

The present invention is a lighting fixture having an improved swivel joint, also referred to as a coupling knuckle. The lighting fixture generally includes an upper conduit having a longitudinal axis, a fixture head disposed at an upper end of the upper conduit, an upper swivel joint member attached to a lower end of the upper conduit opposite the fixture head, a lower swivel joint member rotatably coupled to the upper swivel joint member about a plane of rotation, and a lower conduit attached to the lower swivel joint member, wherein the plane of rotation is disposed at an angle of between zero degrees (0°) and thirty degrees (30°) with respect to the longitudinal axis of the upper conduit.

In a preferred embodiment, the lower conduit also has a longitudinal axis, wherein the longitudinal axis of the lower conduit is parallel to, but laterally offset from, the longitudinal axis of the upper conduit. The upper and lower swivel joint members also preferably include joint surfaces that make sliding rotational contact with each other, wherein the joint surfaces define the plane of rotation.

The upper and lower swivel joint members are preferably in the form of hemispherical cups defining an internal wiring chamber therebetween. Each of the upper and lower hemispherical cups preferably includes a dome shaped wall terminating at a circumferential flange, wherein the circumferential flanges of the cups are coupled together to prevent lateral movement therebetween.

In a preferred embodiment, the light fixture further includes a locking bolt centrally coupling the upper swivel joint member to the lower swivel joint member. The locking bolt defines a centerline of rotation between the upper and lower swivel joint members and is adapted to be selectively tightened to lock the upper swivel joint member to the lower swivel joint member, thereby preventing rotation therebetween. In this regard, each of the upper and lower swivel joint members preferably includes an internal sleeve for receiving the locking bolt. The sleeve of the upper swivel joint member makes annular contact with the sleeve of the lower swivel joint member to prevent over tightening of the locking bolt.

One of the upper and lower swivel joint members preferably includes a stop block fixed thereto and the other of the upper and lower swivel joint members preferably includes a mechanical stop disposed thereon, wherein the stop block makes contact with the mechanical stop upon rotation of the upper swivel joint member to prevent further rotation.

An index pin can also be provided to prevent rotation. Thus, each of the upper and lower swivel joint members can include at least one index pin aperture disposed adjacent a circumferential edge thereof, wherein the aperture of the upper swivel joint member aligns with the aperture of the lower swivel joint member when the swivel joint members are rotated to a desired degree. Insertion of the index pin in the aligned apertures will prevent rotation of the upper swivel joint member with respect to the lower swivel joint member.

The present invention further involves a lighting fixture swivel joint for pivoting an upper conduit having a fixture head disposed at an upper end thereof downward with respect to a lower conduit. The swivel joint generally includes an upper swivel joint member and a lower swivel joint member rotatably coupled to the upper swivel joint member about a plane of rotation. The upper swivel joint member includes an upper conduit receptacle defined by a longitudinal axis and being adapted to receive a lower end of the upper conduit, whereby the upper conduit is coaxially aligned with the longitudinal axis. The plane of rotation is disposed at an angle of between zero degrees (0°) and thirty degrees (30°) with respect to the longitudinal axis of the upper conduit receptacle of the upper swivel joint member.

The lower swivel joint member preferably includes a lower conduit receptacle defined by a longitudinal axis. The lower conduit receptacle is adapted to receive an upper end of the lower conduit, whereby the lower conduit is coaxially aligned with the lower conduit receptacle longitudinal axis. The upper conduit receptacle longitudinal axis is parallel to, but laterally offset from, the lower conduit receptacle longitudinal axis.

The present invention further involves a method for gaining access to a fixture head disposed at an upper end of an upper conduit of a lighting fixture. The method generally includes the step of rotating an upper swivel joint member attached to a lower end of the upper conduit about a plane of rotation with respect to a lower swivel joint member rotatably coupled to the upper swivel joint member, wherein the plane of rotation is disposed at an angle of between zero degrees (0°) and thirty (30°) with respect to a longitudinal axis of the upper conduit.

The method according to the present invention further preferably includes the step of loosening a locking bolt to permit the rotation. The locking bolt centrally couples the upper swivel joint member to the lower swivel joint member and defines a centerline of rotation between the upper and lower swivel joint members.

A preferred form of the lighting fixture, as well as other embodiments, objects, features and advantages of this invention, will be apparent from the following detailed description of illustrative embodiments thereof, which is to be read in conjunction with the accompanying drawings.

DETAILED DESCRIPTION OF ILLUSTRATIVE EMBODIMENTS

Figure 1:
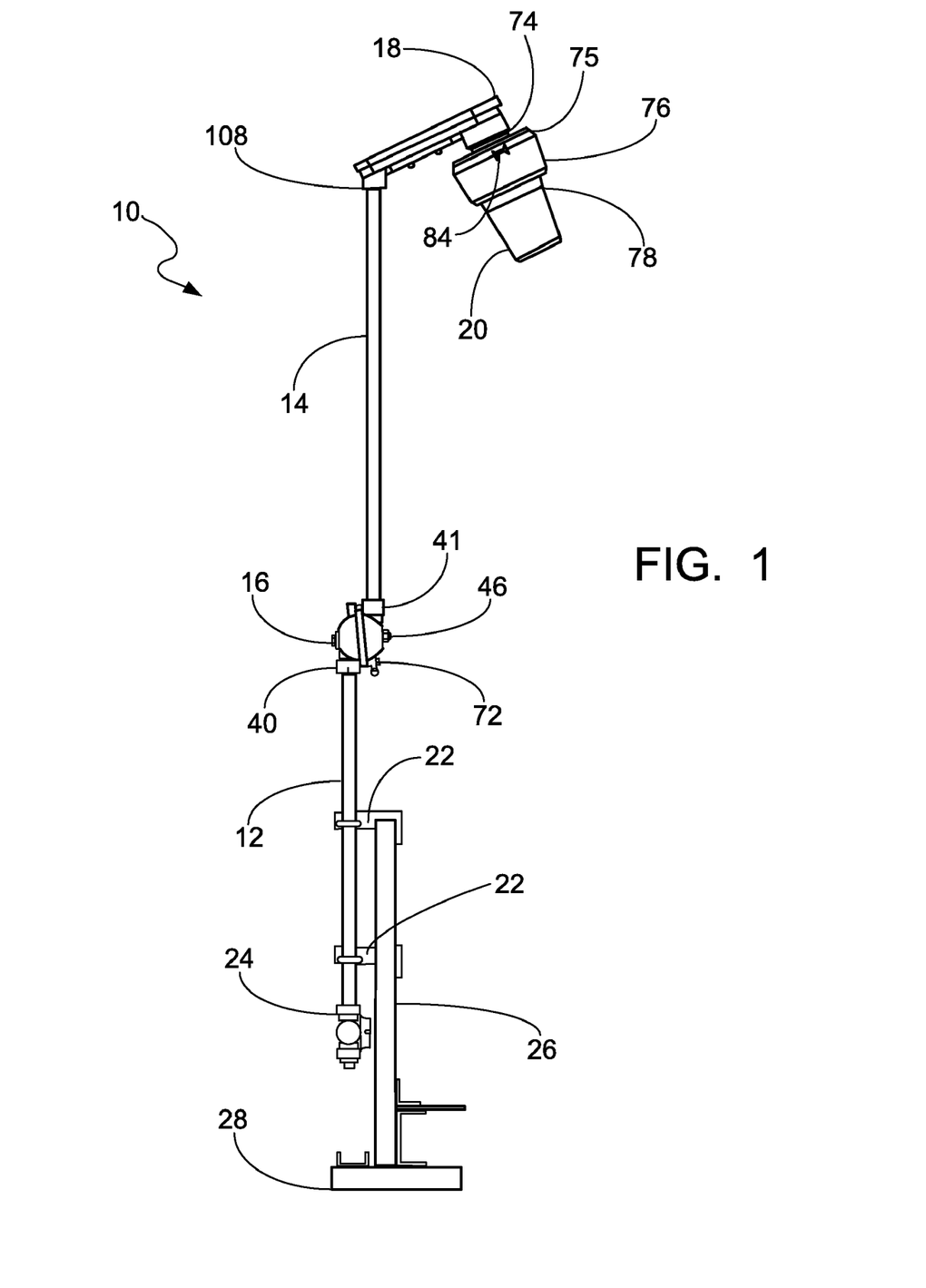
FIG. 1 is a side view of the lighting fixture formed in accordance with the present invention.

Referring first to FIG. 1, the lighting fixture 10 of the present invention generally includes a lower conduit 12, an upper conduit 14, a pivot joint 16, a stanchion arm 18, a fixture head 20, a rail mounting hardware 22 and a junction box 24. The lighting fixture 10 of the present invention is ideally adapted for mounting to a handrail 26 of a catwalk structure 28. Thus, the rail mounting hardware 22 generally includes conventional brackets, angles and bolts for securely attaching the lower conduit 12 to the rail 26. However, the invention is not limited to handrail mounting and other mounting configurations for other lighting applications are within the scope of the present invention.

The lower and upper conduits or tubes 12 and 14 are preferably tubular members made from stainless steel pipe or other durable and weather resistant material. Electrical wiring (not shown) run within the conduits 12, 14 from the junction box 24 to the fixture head 20. Additional wiring conduits (not shown) will generally connect junction boxes 26 of adjacent fixtures 10 mounted along the catwalk.

In order to access the fixture head 20, for service or repair, the upper conduit 14 pivots downwardly about the pivot joint 16 toward the lower conduit 12. This is accomplished by a unique design of the pivot joint 16, which enables the fixture head 20 to be brought down toward a maintenance worker standing on the catwalk 28.

Figure 2:
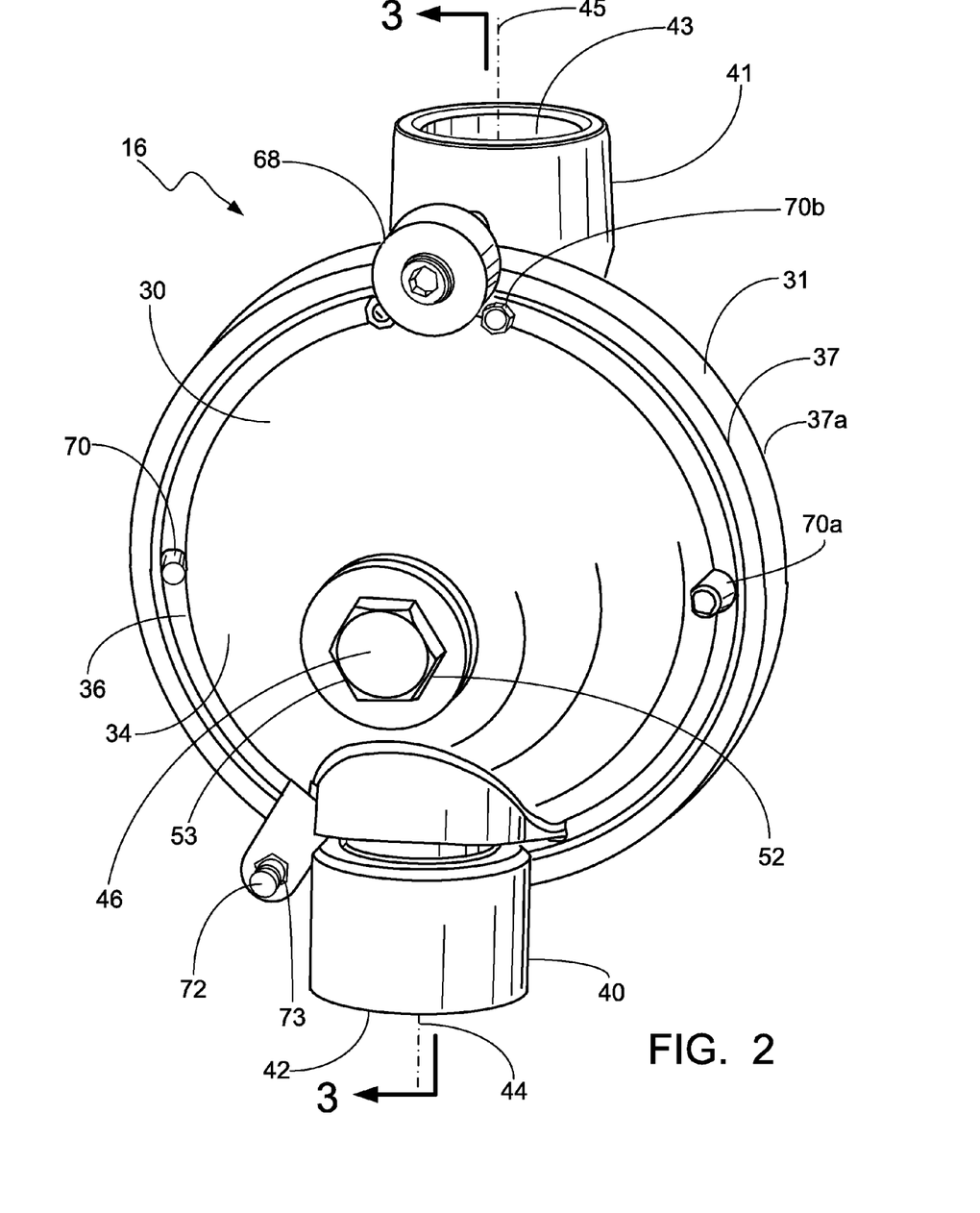
FIG. 2 is a perspective view of the pivot joint for the lighting fixture of the present invention.
Figure 3:
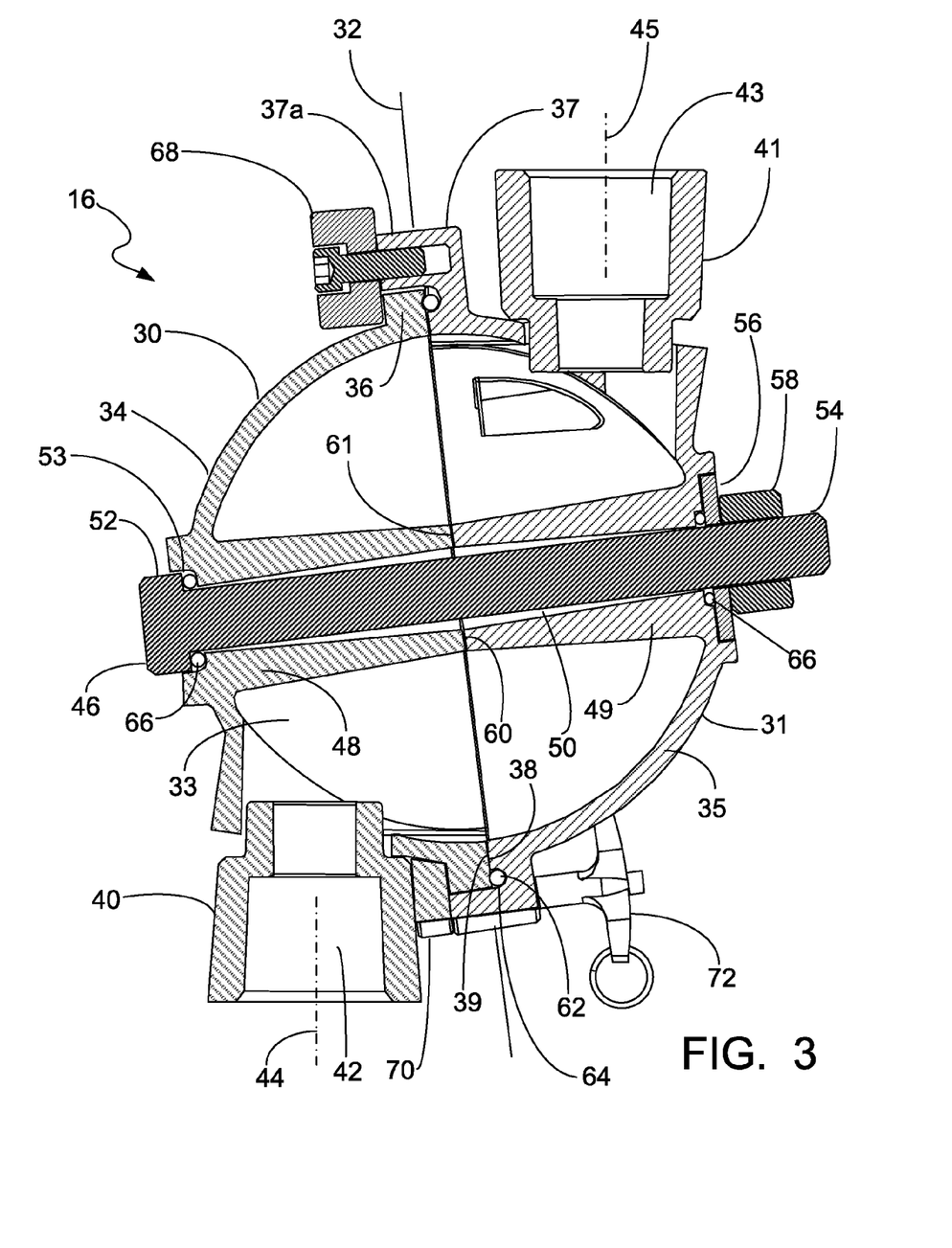
FIG. 3 is a cross-sectional view of the pivot joint shown in FIG. 2.

Turning to FIGS. 2 and 3, the pivot joint 16, also referred to as a swivel joint or a hinging knuckle, includes a lower swivel joint member 30 and an upper swivel joint member 31, which make sliding rotational contact along a plane of rotation 32, sometimes referred to as a swivel plane. The lower and upper swivel joint members 30, 31 are preferably in the form of cast hemispherical cups, which define a wiring chamber 33 therebetween. Each bowl-shaped cup 30, 31 includes an outer dome wall 34, 35 which terminates at a flange 36, 37. In a preferred embodiment, one flange is nested within the other flange so as to prevent excess lateral movement between the cups. For example, as shown in FIGS. 2 and 3, the flange 37 of the upper cup 31 is preferably provided with a lip 37a disposed radially outward from the perimeter of the lower cup flange 36 so as to retain the lower cup flange therein. Thus, as will be discussed in further detail below, when the locking bolt 46 is loosened slightly, the lower and upper cups 30, 31 will remain engaged to some extent.

The flange 36 of the lower cup 30 has a machined joint surface 38, which mates in a sliding relationship with a machined joint surface 39 provided on the flange 37 of the upper cup 31. The machined joint surfaces 38 and 39 of the lower and upper cups 30 and 31 define the swivel plane 32 of the pivot joint 16.

The lower cup 30 further includes a lower conduit receptacle 40 adapted to securely receive an upper end of the lower conduit 12. The lower conduit receptacle 40 is provided on the outer surface of the dome wall 34 and forms a well 42 defined by an axis 44. The inner surface of the well 42 can be internally threaded to engage an external thread of the upper end of the lower conduit 12, or can be adapted for welding to the lower conduit, or provided with other means to attach the lower conduit therein.

The plane defined by the machined joint surface 38 of the lower cup 30 is disposed at a zero (0) to thirty (30) degree angle with respect to the axis 44 of the lower conduit receptacle well 42. In a preferred embodiment, the angle between the plane defined by the machined joint surface 38 of the lower cup 30 and the axis 44 of the lower conduit receptacle well 42 is about fifteen (15) degrees.

Similarly, the upper cup 31 further includes an upper conduit receptacle 41 adapted to securely receive a lower end of the upper conduit 14. The upper conduit receptacle 41 is provided on the outer surface of the dome wall 35 and forms a well 43 defined by an axis 45. Again, the inner surface of the well 41 can be internally threaded to engage an external thread of the lower end of the upper conduit 14, or can be adapted for welding to the upper conduit, or provided with other means to attach the upper conduit therein.

The plane defined by the machined joint surface 39 of the upper cup 31 is disposed at a zero (0) to thirty (30) degree angle with respect to the axis 45 of the upper conduit receptacle well 43. In a preferred embodiment, the angle between the plane defined by the machined joint surface 39 of the upper cup 31 and the axis 45 of the lower conduit receptacle well 43 is about fifteen (15) degrees.

The lower and upper cups 30, 31 are preferably held together by a single locking bolt 46, which passes through the interior wiring chamber 33 formed by the cups. In this regard, each cup 30, 31 is preferably formed with an internal cast-in sleeve 48, 49 defining a passageway 50 through which the bolt extends. The bolt 46 includes a head 52, which is retained within a similarly shaped recess 53 of the lower cup 30 surrounding the passageway 50, to prevent rotation of the head. Thus, in the case of a hexagonal bolt 46, as shown in FIGS. 2 and 3, the lower cup 30 would have a hexagonal recess 53 formed in the annular region surrounding the passageway 50. The bolt 46 has a threaded end 54 opposite the head, and a washer 56 and a nut 58 are preferably provided on the threaded end 54 to provide a compressive force against an annular region of the upper cup 31 surrounding the passageway 50. An annular face 60 of the lower cup inner sleeve 48 contacts an annular face 61 of the upper cup inner sleeve 49 to prevent over-tightening of the bolt 46.

The inner wiring chamber 33 defined by the lower and upper cups 30, 31 provides a water-tight passageway for electrical wiring (not shown) passing from the lower conduit 12 to the upper conduit 14. To enhance the water-tight construction, one or both of the mating surfaces 38, 39 of the lower and upper cups 30, 31 is formed with a circumferential groove 62, in which an o-ring 64 can be seated, as shown in FIG. 3. One or more additional locking bolt o-rings 66 can also be provided to seal the interface between the locking bolt ends and the lower and/or upper cups 30, 31. The wiring within the wiring chamber 33 is further protected by the internal cast-in sleeves 48, 49 of the lower and upper cups 30, 31.

Upon assembly, the axes 44, 45 of the lower and upper receptacles 40, 41 will typically be oriented in a vertical direction, whereby the lower and upper conduits 12, 14 will extend vertically parallel with each other. Moreover, the axes 44, 45 of the lower and upper receptacles 40, 41 are not co-axial or co-linear with each other, but instead are laterally offset from each other.

In operation, the nut 58 of the locking bolt 46 is loosened to permit the lower and upper cups 30, 31 to slide against each other along their respective mating surfaces 38, 39, 60, 61. The sliding contact between the cups 30, 31 acts as a brake to prevent the upper conduit 14 from pivoting too rapidly. In this regard, use of a single locking bolt 46 allows better control of contact pressure during servicing.

Figure 4:
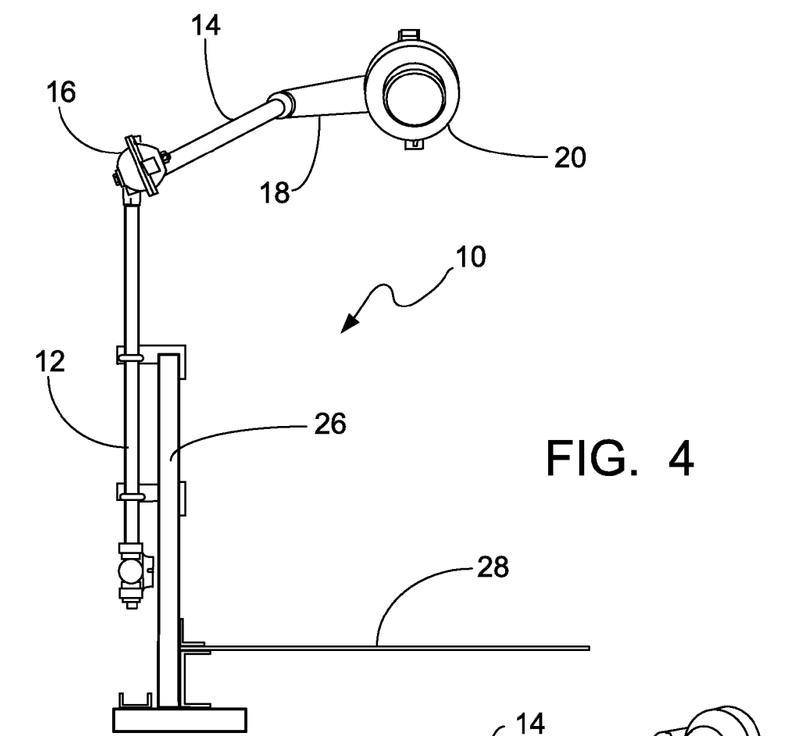
FIG. 4 is a side view of the lighting fixture of the present invention showing a top portion of the fixture being pivoted downward for servicing.

By orienting the swivel plane 32 at a zero to thirty degree angle with respect to vertical (ninety to sixty degrees with respect to horizontal), and more preferably at a fifteen degree angle with respect to vertical (seventy-five degrees with respect to horizontal), the upper conduit 14 can be pivoted to a position that enables safe and easy access to the fixture head 20 to a maintenance worker standing on the catwalk 28, as shown in FIGS. 3 and 4. In other words, the "rotation plane" 32 between the two cups 30, 31 is nearly parallel to the extending tubes. As compared to prior art swivel joints having a forty-five (45) degree rotation plane with respect to the longitudinal axis of the extending conduits 12, 14, the present design provides the ability to pivot the two extending tubes back upon themselves to reverse course nearly one hundred eighty (180) degrees.

Figure 5:
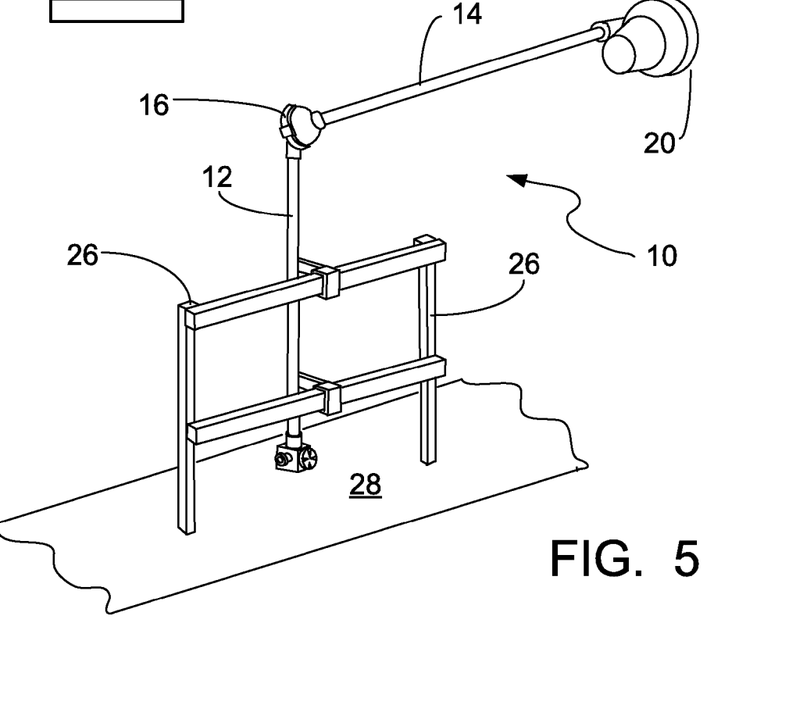
FIG. 5 is a top perspective view of the lighting fixture shown in FIG. 3.

The importance of this feature is shown in FIGS. 4 and 5. In particular, in the case of conventional swivel joints having a forty-five (45) degree rotation plane, the upper extension 14 would, when swung or rotated for access from the catwalk 28, extend well into the catwalk and maybe even beyond it over the rail or into other structures. This is not the case with the present design since the near vertical rotation plane 32 between the lower and upper cups 30, 31 allows the two extending tubes 12, 14 to be rotated back on themselves so that they are nearly parallel to each other. This means that a technician can now easily access the fixture head 20 from the catwalk 28 since the upper end of the upper conduit 14 no longer extends out from the knuckle 16 to any significant degree. Thus, the technician does not have to lean over the railing 26 of the catwalk 28 to access the fixture head 20. Furthermore, as shown in FIGS. 4 and 5, the rotated fixture head 20 does not obstruct the catwalk 28 as would be the case with prior knuckle designs.

To provide positive positioning upon pivoting, the swivel joint 16 can further be provided with a stop block 68, mechanical stops 70 and/or an indexing pin 72. More particularly, a durable rubber stop block 68 can be fastened to the flange 37 of the upper cup 31 and one or more mechanical stops 70 can be provided on the flange 36 of the lower cup 30. (Of course, this arrangement can be reversed.) The mechanical stops 70 can be integrally cast stops 70a, or they can take the form of bolts 70b, or some other form of fasteners, removably attached to the lower cup 30. The stop block 68 and the mechanical stop 70 can be radially spaced ninety degrees (90°), one hundred eighty degrees (180°), or any other desired angle, with respect to each other. Moreover, removable stops 70b can be provided to lock the lower and upper cups 30, 31 in a vertical orientation, as shown in FIG. 2. When the removable stops 70b are removed, as the upper cup 31 is rotated about the locking bolt 46 with respect to the lower cup 30, the stop block 68 will make contact with the mechanical stop 70a at the desired angle and will prevent further rotation. For additional safety, an indexing pin 72 can be inserted through aligned holes formed in the lower and upper cup flanges 36, 37 to temporarily lock the cups with respect to each other.

Figure 6:
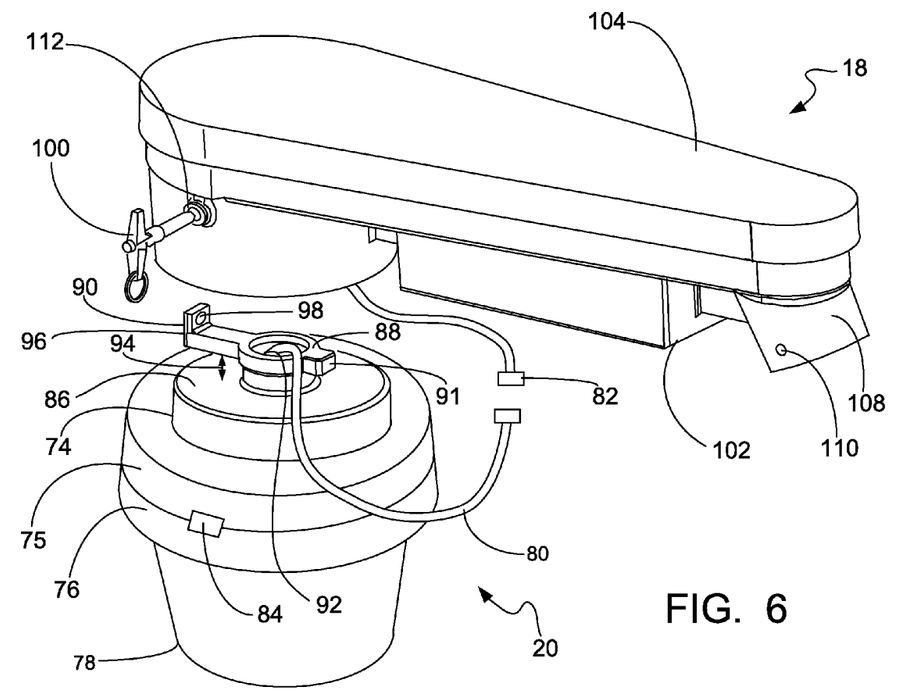
FIG. 6 is a top perspective view of the stanchion arm of the lighting fixture of the present invention showing the lighting fixture removed therefrom.
Figure 7:
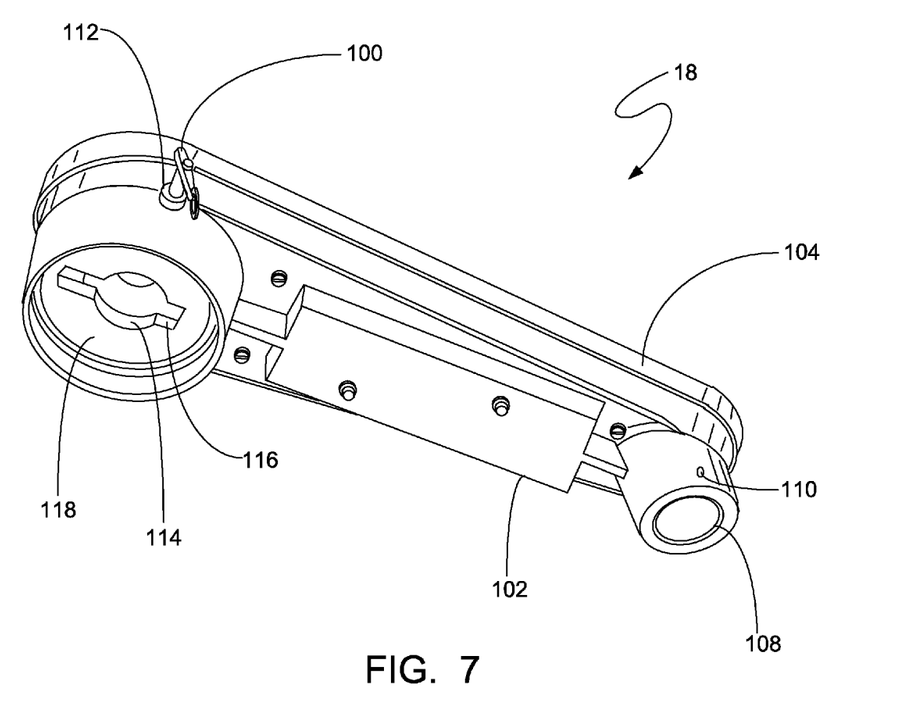
FIG. 7 is a bottom perspective view of the stanchion arm shown in FIG. 5.

Turning now to FIG. 6, the fixture head 20 of the present invention generally includes a hub 74, a mount 75, a ballast tank 76 and a refractor or lens 78. As will be discussed in further detail below, the hub 74 is specially designed for unique engagement with the stanchion arm 18. The hub 74 is attached to the mount 75 with conventional screws or bolts, for example, and the mount 75, in turn, is releasably attached to the ballast tank 76. The ballast tank 76 and the refractor 78 can be of conventional design, and will generally contain a source of illumination, such as a lamp, ballast components and a wiring harness 80 for connection with a fixture wiring harness 82 of the stanchion arm 18. A latch mechanism 84 is preferably provided between the mount 75 and the ballast tank 76 so that the ballast tank can be detached from the mount. The latch mechanism 84 is preferably designed for universal latching with any number of conventional ballast tanks 76.

Figure 13:
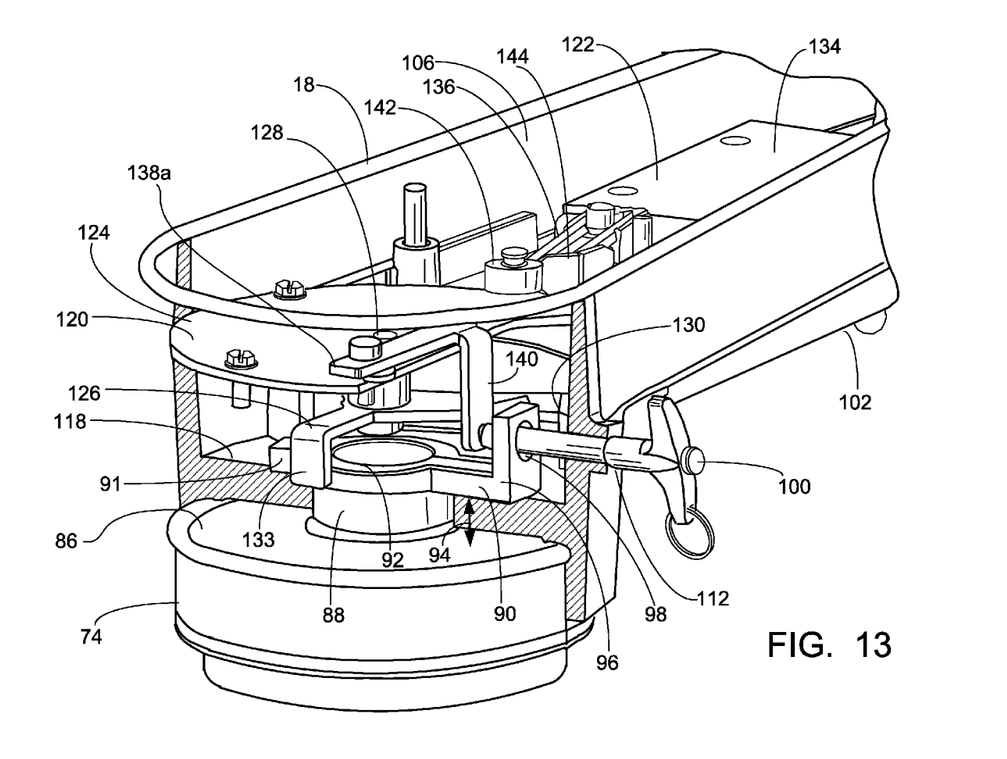
FIG. 13 is a partial cross-sectional view of the stanchion arm and hub assembly shown in FIG. 12.

With additional reference to FIG. 13, the hub 74 includes a base 86, a circular boss 88 extending upwardly from the center of a top surface thereof and a finger 90 extending radially outward from the boss. The base 86 and the boss 88 have a central opening 92 formed therein for passage of the ballast tank wiring harness 80 therethrough. The finger 90 is spaced above the top surface of the base 86 so as to leave a gap 94 therebetween. The finger 90 also includes an upright portion 96 extending perpendicularly upward from the finger in an axial direction away from the base 86. The upright portion 96 includes an aperture 98 for receiving a locking pin 100 of the stanchion arm 18, as will be discussed in further detail below.

The hub 74 preferably further includes at least one counter finger 91 extending radially outward from the circular boss. The counter finger 91 is disposed at the same height with respect to the base plate 86 so as to define a similar gap therebetween as described above. As will be discussed in further detail below, the counter finger 91 provides additional rigidity to the fixture head 20 when mounted to the stanchion arm 18.

Referring additionally to FIGS. 7-11, the stanchion arm 18 generally includes a housing 102 and a cover 104 removably attached to the housing. The housing 102 defines a compartment 106 for containing the internal parts of the stanchion arm 18. The housing 102 further includes an upper conduit receptacle 108 adapted to receive the upper end of the upper conduit 14 for mounting thereto. The upper conduit receptacle 108 can be internally threaded to mate with an external thread provided on the upper end of the upper conduit 14, and can also include one or more set screw apertures 110 for receiving one or more set screws to lock the stanchion arm 18 to the upper conduit 14.

The housing 102 further includes a locking pin aperture 112 sized to receive the fixture head locking pin 100. A rim or other bearing element is preferably provided around the aperture 112 to add strength. The locking pin 100 is preferably tethered to the housing 102 to prevent loss of the pin when not inserted in the aperture 112.

The housing 102 further includes a key-hole shaped entry 114 sized to receive the circular boss 88 and finger 90 of the fixture head hub 74. The entry 114 further preferably includes a notch 116 sized to receive the counter finger 91 of the hub 74. The entry 114 is simply a cut-out portion in the bottom 118 of the housing 102 that will allow insertion of the top of the circular boss 88, the finger 90 and the counter finger 91 of the hub 74 into the housing. The thickness of the housing bottom 118 surrounding the entry 114 must be less than the gap 94 between the hub finger 90 and the hub base plate 86 to allow insertion and rotation of the hub finger 90 within the housing 102, as will be discussed in further detail below.

Contained within the housing 102 are a guard mechanism 120 and a switch mechanism 122. The guard mechanism 120 includes a hat member 124 mounted to the bottom 118 of the housing 102 at least partly over the entry 114. The hat member 124 is spaced above the housing bottom 118 a sufficient distance to allow full insertion and rotation of the hub finger 90 within the housing. The guard mechanism 120 further includes a guard lever 126 pivotally attached to the hat member 124 about a pivot point 128. The guard lever 26 must also be spaced above the housing bottom 118 a sufficient distance to allow full insertion and rotation of the hub finger 90 within the housing. The guard lever 126 includes a blocking face 130 opposite the pivot point 128, which, when the guard lever is in a home position, blocks the locking pin aperture 112 of the housing.

Figure 8:
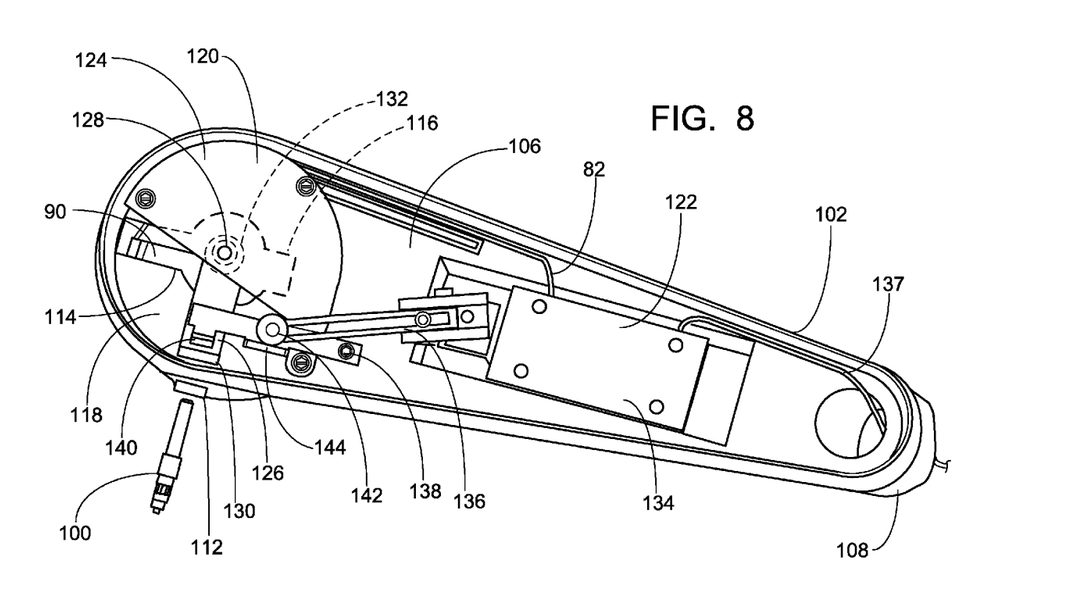
FIG. 8 is a top view of the stanchion arm shown in FIG. 5 with its top cover removed showing the hub of the fixture head being inserted therein.

The guard lever 126 can be maintained in its home position by any suitable means. In one embodiment, the guard lever 126 is spring biased into its home position by one or more helical springs 132 provided between the hat member 124 and the guard lever adjacent the pivot point, as shown in FIG. 8. Such spring biasing will return the guard lever 126 to its home position when no longer urged out of the way, whereby the blocking face 130 will again block the locking pin aperture 112.

However, in a preferred embodiment, as shown in FIG. 13, the spring can be eliminated by providing the guard lever with a tab 133 angularly spaced from the blocking face 130, which engages the hub finger 90 when the hub 74 is rotated in a reverse direction upon removal of the hub from the stanchion arm housing 102. Specifically, when removing the fixture head 20 from the stanchion arm 18, the hub 74 is rotated so that the hub finger 90 moves away from the locking pin aperture 112 into alignment with the key-hole entry 114 of the stanchion arm housing 102. As the finger 90 moves away from the locking pin aperture 112, it contacts the tab 133 of the guard lever 126, which causes the guard lever to rotate about its pivot point 128. This rotation returns the guard lever 126 to its home position, whereby the blocking face 130 takes up residence at the locking pin aperture 112 to block entry of the locking pin 100.

The switch mechanism 122 generally includes a limit switch 134 and an actuating arm 136 pivotally connected to the limit switch. The limit switch 134 can be an off-the-shelf variety, but is preferably rated for a high number of cycles in harsh environments and preferably includes hermitically sealed contacts to isolate the connections from the environment. Wires 137 coming from the upper conduit 14 are fed through the upper conduit receptacle 108 and are connected to one pole of the switch 134 and the wiring harness 82 coming from the fixture head 20 is connected to the opposite pole of the switch. The actuating arm 136 is attached to the mechanical portion of the limit switch 134 so that pivoting of the arm will activate the switch to provide a current path between the wiring 137 of the upper conduit 14 and the wiring harness 82.

The actuating arm 136 preferably includes a contact member 138 pivotally attached to the housing. The contact member 138 includes a locking pin contact face 140 disposed at the locking pin aperture 112 of the housing behind the blocking face 130 of the lever guard 126, when the lever guard is in its home position. In other words, the locking pin 100 cannot make contact with the contact face 140 of the contact member 126 when the contact member is in its home position. Mechanical cooperation between the contact member 138 and the actuating arm 136 can be achieved, for example, via a cam roller 142 provided on the actuating arm and which is engaged with a roller surface 144 provided on the contact member.

Figure 10:
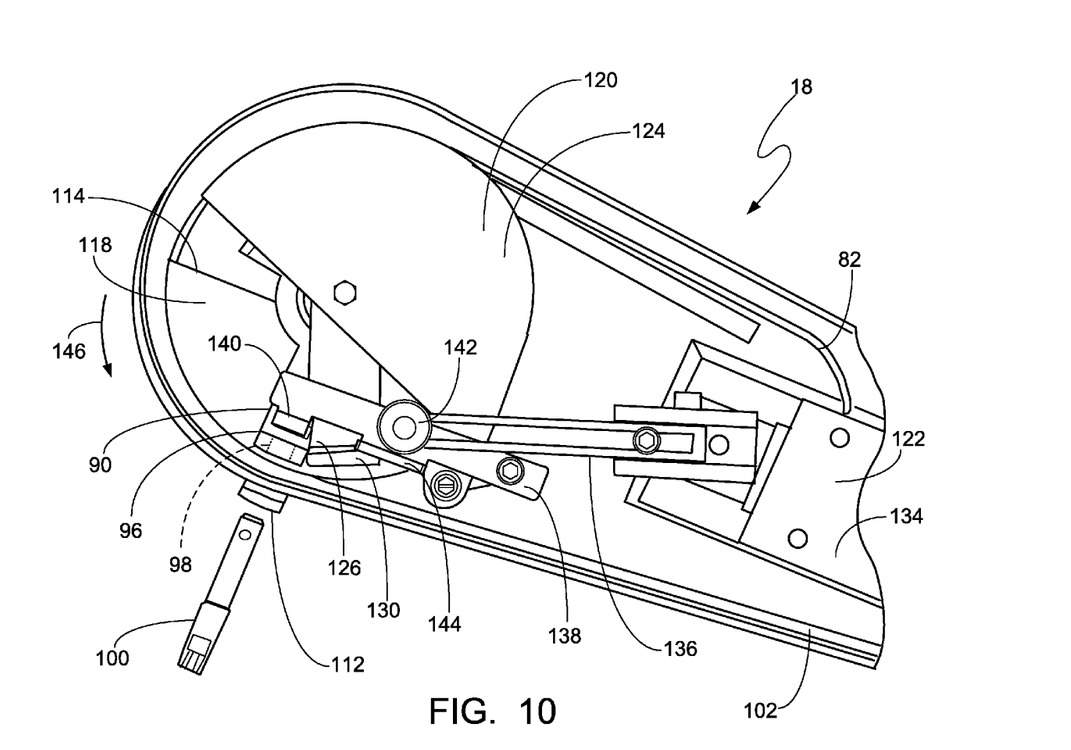
FIG. 10 is a top view of the stanchion arm shown in FIG. 5 with its top cover removed showing the hub of the fixture head engaging a guard lever.
Figure 11:
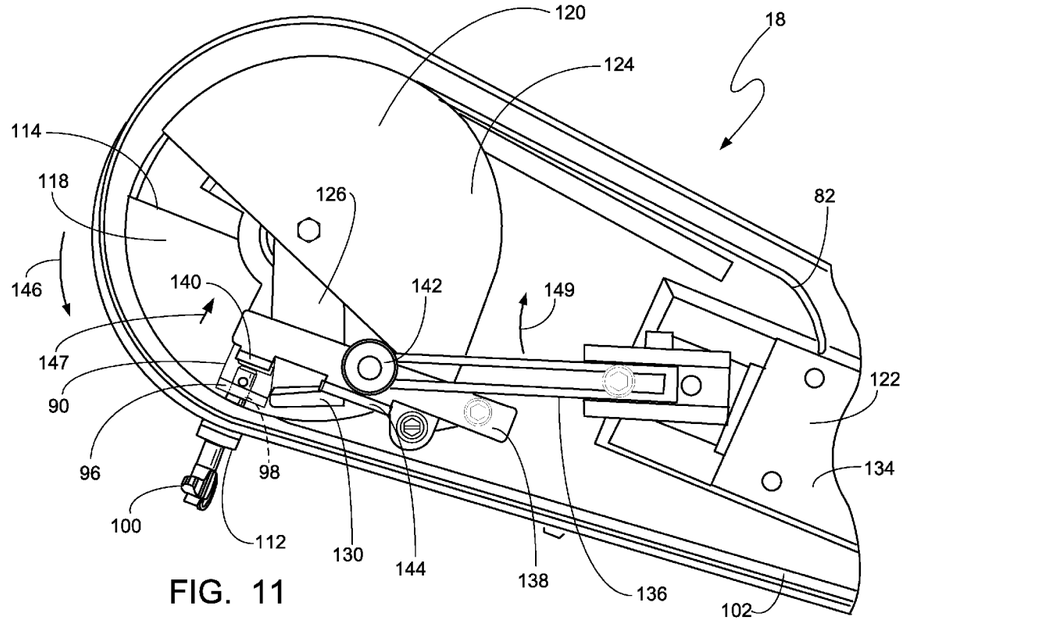
FIG. 11 is a top view of the stanchion arm shown in FIG. 5 with its top cover removed showing a pin inserted through the arm and the hub and actuating an electrical switch.
Figure 12:
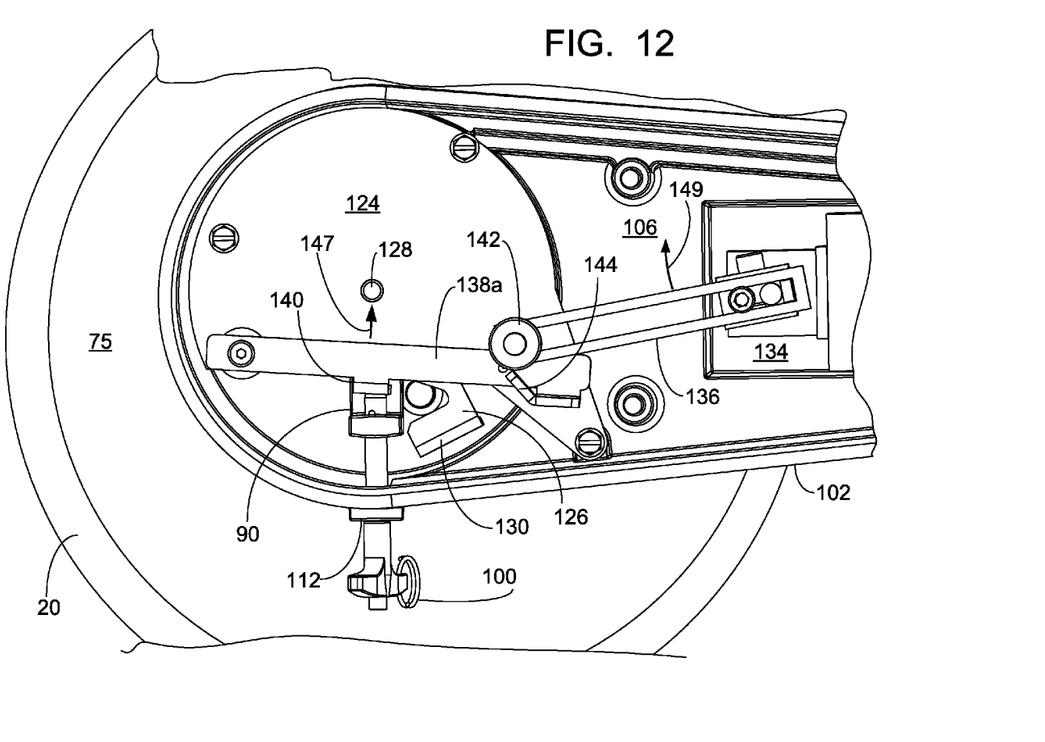
FIG. 12 is a top view of the stanchion arm shown in FIG. 5 with its top cover removed showing an alternative embodiment of the guard lever and the contact member.

In one embodiment, as shown in FIGS. 8-11, the contact member 138 is pivotally connected to the bottom 118 of the housing 102 at one end, with the opposite end of the contact member having the contact face 140 and the roller surface 144 being disposed therebetween. In an alternative embodiment, as shown in FIGS. 12 and 13, the contact member 138a is pivotally attached to the hat member 124 at one end, with the opposite end of the contact member having the roller surface 144 and the contact face 140 being disposed therebetween. In any event, pivoting of the contact member 138 about its pivot point causes the actuating arm 136 to pivot with respect to the limit switch 134, thereby changing the state of the switch.

Here too, the contact member 138, 138a and/or the actuating arm 136 are preferably spring biased into a home position, wherein the switch 134 is open and whereby the electrical current is interrupted to the fixture head. When the contact face 140 of the contact member 138, 138a is pushed back by the locking pin 100, as will be described in further detail below, the actuating arm 136 is pivoted thereby closing the switch to provide a current path to the fixture head 20.

In use, installation of the fixture head 20 can be carried out as follows. First, with the tethered locking pin 100 removed and the limit switch 134 open, the wiring harness 80 of the fixture head 20 is electrically and mechanically coupled to the wiring harness 82 of the stanchion arm 18, as shown in FIG. 6. This is accomplished safely and without the risk of arcing since the limit switch 134 is in its home open state prior to installation of the fixture head 20 in the stanchion arm.

As shown in FIG. 8, the hub 74 of the fixture head 20 is brought up to the stanchion arm 18 and the boss 88, the finger 90 and the counter finger 91 are inserted through the entry 118 of the bottom 118 of the stanchion arm housing 102. The hub 74 is then rotated, as indicated by arrow 146 of FIG. 9, until the hub finger 90 engages the lever guard 126. As the hub 74 is rotated, the bottom 118 of the housing 102 surrounding the entry 114 is captured in the gap 94 formed between the hub base plate 86 and the bottom of the finger 90. The counter finger 91 of the hub 74 also retains a portion of the bottom 118 of the housing 102 to securely couple the hub to the stanchion arm 18.

The hub 74 is rotated further so that the upright portion 96 of the hub finger 90 pushes the blocking face 130 of the lever guard 126 away from its blocking position behind the locking pin aperture 112 of the housing 102, as shown in FIG. 10. As described above, the blocking face 130 will normally prevent insertion of the pin 100 through the housing aperture 112 when the lever guard 126 is in its home position.

With the blocking face 130 of the lever guard thus pivoted out of position, the locking pin aperture 98 of the finger upright portion 96 can be brought into alignment with the locking pin aperture 112 of the housing 102. Once the apertures 98, 112 are aligned, the locking pin 100 can be inserted through the housing 102 into the upright portion 96 of the finger 90, as shown in FIGS. 11-13. As the pin 100 is inserted through the aperture 98 of the finger upright portion 96, it will push the contact face 140 of the contact member 138, 138a in the direction of arrow 147, as shown in FIG. 11, causing the contact member to pivot about its pivot point. Pivoting of the contact member 138, 138a will in turn urge the actuating arm 136 out of its home position in the direction of arrow 149, thereby closing the switch 134 to provide current to the fixture head 20. Thus, power is automatically provided to the fixture head 20 upon locking the hub 74 to the stanchion arm 18 with the locking pin 100.

The upper conduit 14 is then swiveled back to its upright vertical position by pivoting the upper cup 31 with respect to the lower cup 30 of the swivel joint. Once the upper conduit 14 is in position, the swivel joint indexing pin 72 can be inserted and the nut 58 securing the locking bolt 46 can be tightened, as described above, to complete the installation.

Removal of a fixture head 20 can be accomplished essentially in reverse. With the swivel joint indexing pin 72 removed and the nut 58 of the locking bolt 46 loosened, the upper cup 31 of the joint 16 is rotated with respect to the lower cup 30 to pivot the upper conduit 14 downward to provide access to the fixture head 20. The locking pin 100 is then removed from the housing 102, thereby releasing the contact member 138, 138a and actuating arm 136 and returning the limit switch 134 to its open state. Thus, electricity is automatically terminated to the fixture head 20 upon removal of the locking pin 100.

Figure 9:
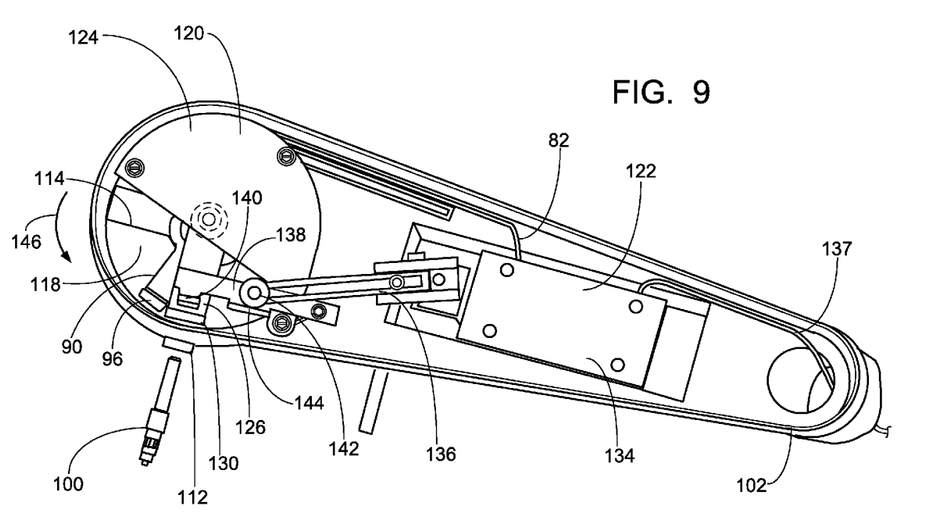
FIG. 9 is a top view of the stanchion arm shown in FIG. 5 with its top cover removed showing the hub of the fixture head being rotated therein.

The fixture head hub 74 can then be rotated in a direction opposite to the arrow 146 of FIG. 9 until the finger 90 of the hub aligns with its corresponding portion of the housing entry 114. The hub 74 can then be lowered away from the stanchion arm 18 and the wiring harness 80 of the fixture head 20 can be safely disconnected from the wiring harness 82 of the stanchion arm 18.

As a result of the present invention, a lighting fixture has been provided that permits safe and easy servicing. The lighting fixture, which, when assembled, is typically about ten (10) feet high, is accessed by tilting an upper mounting pole downward with respect to a lower mounting pole. A unique swivel joint, or knuckle, located in the middle of the fixture between the mounting poles permits such tilting.

Another feature of the present invention is the locking/ switching mechanism incorporated between the fixture head and the stanchion arm that automatically disconnects the power to the individual fixture during servicing. Conversely, power can be activated only when the fixture head is installed and secured to the stanchion arm.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A lighting fixture comprising:
    an upper conduit having a longitudinal axis;
    a fixture head disposed at an upper end of said upper conduit;
    an upper swivel joint member attached to a lower end of said upper conduit opposite said fixture head;
    a lower swivel joint member rotatably coupled to said upper swivel joint member about a plane of rotation, said plane of rotation being disposed at an angle of between zero degrees (0°) and thirty degrees (30°) with respect to said longitudinal axis of said upper conduit;
    a lower conduit attached to said lower swivel joint member; and
    a locking mechanism coupling said upper swivel joint member to said lower swivel joint member, said locking mechanism permitting rotation between said upper and lower swivel joint members and being selectively tightenable to lock said upper swivel joint member to said lower swivel joint member, thereby preventing rotation therebetween,
    wherein said lower conduit has a longitudinal axis, said longitudinal axis of said lower conduit being parallel to, but laterally offset from, said longitudinal axis of said upper conduit.

2. A lighting fixture as defined in claim 1, wherein said upper swivel joint member includes a joint surface and said lower swivel joint member includes a joint surface making sliding rotational contact with said joint surface of said upper swivel joint member, said joint surfaces of said upper and lower joint members defining said plane of rotation.

3. A lighting fixture as defined in claim 1, wherein said upper and lower swivel joint members are hemispherical cups defining an internal wiring chamber therebetween.

4. A lighting fixture as defined in claim 1, wherein said locking mechanism comprises a locking bolt centrally coupling said upper swivel joint member to said lower swivel joint member, said locking bolt defining a centerline of rotation between said upper and lower swivel joint members and being selectively tightenable to lock said upper swivel joint member to said lower swivel joint member, thereby preventing rotation therebetween.

5. A lighting fixture as defined in claim 1, further comprising:
an index pin, and wherein each of said upper and lower swivel joint members includes at least one index pin aperture disposed adjacent a circumferential edge thereof, said aperture of said upper swivel joint member aligning with said aperture of said lower swivel joint member, whereby insertion of said index pin in said aligned apertures prevents rotation of said upper swivel joint member with respect to said lower swivel joint member.

6. A lighting fixture comprising:
an upper conduit having a longitudinal axis;
a fixture head disposed at an upper end of said upper conduit;
an upper swivel joint member attached to a lower end of said upper conduit opposite said fixture head;
a lower swivel joint member rotatably coupled to said upper swivel joint member about a plane of rotation, said plane of rotation being disposed at an angle of between zero degrees (0°) and thirty degrees (30°) with respect to said longitudinal axis of said upper conduit; and
a lower conduit attached to said lower swivel joint member,
wherein said upper and lower swivel joint members are hemispherical cups defining an internal wiring chamber therebetween, and wherein each of said upper and lower hemispherical cups includes a dome shaped wall terminating at a circumferential flange, said circumferential flanges of said upper and lower hemispherical cups being coupled together to prevent lateral movement therebetween.

7. A lighting fixture comprising:
an upper conduit having a longitudinal axis;
a fixture head disposed at an upper end of said upper conduit
an upper swivel joint member attached to a lower end of said upper conduit opposite said fixture heath;
a lower swivel joint member rotatably coupled to said upper swivel joint member about a plane of rotation, said plane of rotation being disposed at an angle of between zero degrees (0°) and thirty degrees (30°) with respect to said longitudinal axis of said upper conduit
a lower conduit attached to said lower swivel joint member; and
a locking mechanism coupling said upper swivel joint member to said lower swivel joint member, said locking mechanism permitting rotation between said upper and lower swivel joint members and being selectively tightenable to lock said upper swivel joint member to said lower swivel joint member, thereby preventing rotation therebetween, wherein said locking mechanism comprises a locking bolt centrally coupling said upper swivel joint member to said lower swivel joint member, said locking bolt defining a centerline of rotation between said upper and lower swivel joint members and being selectively tightenable to lock said upper swivel joint member to said lower swivel joint member, thereby preventing rotation therebetween, and
wherein each of said upper and lower swivel joint members includes an internal sleeve for receiving said locking bolt, said sleeve of said upper swivel joint member making annular contact with said sleeve of said lower swivel joint member to prevent over tightening of said locking bolt.

8. A lighting fixture comprising:
an upper conduit having a longitudinal axis;
a fixture head disposed at an upper end of said upper conduit;
an upper swivel joint member attached to a lower end of said upper conduit opposite said fixture head;
a lower swivel joint member rotatably coupled to said upper swivel joint member about a plane of rotation, said plane of rotation being disposed at an angle of between zero degrees (0°) and thirty degrees (30°) with respect to said longitudinal axis of said upper conduit; and
a lower conduit attached to said lower swivel joint member,
wherein one of said upper and lower swivel joint members includes a stop block fixed thereto and the other of said upper and lower swivel joint members includes a mechanical stop disposed thereon, said stop block making contact with said mechanical stop upon rotation of said upper swivel joint member to prevent further rotation.

9. A lighting fixture swivel joint for pivoting an upper conduit having a fixture head disposed at an upper end thereof downward with respect to a lower conduit, the swivel joint comprising:
an upper swivel joint member having an upper conduit receptacle defined by a longitudinal axis, said upper conduit receptacle being adapted to receive a lower end of the upper conduit, whereby the upper conduit is coaxially aligned with said longitudinal axis;
a lower swivel joint member rotatably coupled to said upper swivel joint member about a plane of rotation, said plane of rotation being disposed at an angle of between zero degrees (0°) and thirty degrees (30°) with respect to said longitudinal axis of said upper conduit receptacle of said upper swivel joint member; and
a locking mechanism coupling said upper swivel joint member to said lower swivel joint member, said locking mechanism permitting rotation between said upper and lower swivel joint members and being selectively tightenable to lock said upper swivel joint member to said lower swivel joint member, thereby preventing rotation therebetween,
wherein said lower swivel joint member includes a lower conduit receptacle defined by a longitudinal axis, said lower conduit receptacle being adapted to receive an upper end of the lower conduit, whereby the lower conduit is coaxially aligned with said lower conduit receptacle longitudinal axis, and wherein said upper conduit receptacle longitudinal axis is parallel to, but laterally offset from, said lower conduit receptacle longitudinal axis.

10. A swivel joint as defined in claim 9, wherein said upper swivel joint member includes a joint surface and said lower swivel joint member includes a joint surface making sliding rotational contact with said joint surface of said upper swivel joint member, said joint surfaces of said upper and lower joint members defining said plane of rotation.

11. A swivel joint as defined in claim 9, wherein said upper and lower swivel joint members are hemispherical cups defining an internal wiring chamber therebetween.

12. A swivel joint as defined in claim 9, wherein said locking mechanism comprises a locking bolt centrally coupling said upper swivel joint member to said lower swivel joint member, said locking bolt defining a centerline of rotation between said upper and lower swivel joint members and being selectively tightenable to lock said upper swivel joint member to said lower swivel joint member, thereby preventing rotation therebetween.

13. A lighting fixture swivel joint as defined in claim 9 further
    an index pin, and wherein each of said upper and lower swivel joint members includes at least one index pin aperture disposed adjacent a circumferential edge thereof, said aperture of said upper swivel joint member aligning with said aperture of said lower swivel joint member, whereby insertion of said index pin in said aligned apertures prevents rotation of said upper swivel joint member with respect to said lower swivel joint member.

14. A lighting fixture swivel joint for pivoting an upper conduit having a fixture head disposed at an upper end thereof downward with respect to a lower conduit, the swivel joint comprising:
    an upper swivel joint member having an upper conduit receptacle defined by a longitudinal axis, said upper conduit receptacle being adapted to receive a lower end of the upper conduit, whereby the upper conduit is coaxially aligned with said longitudinal axis; and
    a lower swivel joint member rotatably coupled to said upper swivel joint member about a plane of rotation, said plane of rotation being disposed at an angle of between zero degrees (0°) and thirty degrees (30°) with respect to said longitudinal axis of said upper conduit receptacle of said upper swivel joint member,
    wherein said upper and lower swivel joint members are hemispherical cups defining an internal wiring chamber therebetween, and wherein each of said upper and lower hemispherical cups includes a dome shaped wall terminating at a circumferential flange, said circumferential flanges of said hemispherical cups being coupled together to prevent lateral movement therebetween.

15. A lighting fixture swivel joint for pivoting an upper conduit having a fixture head disposed at an upper end thereof downward with respect to a lower conduit, the swivel joint comprising:
    an upper swivel joint member having an upper conduit receptacle defined by a longitudinal axis, said upper conduit receptacle being adapted to receive a lower end of the upper conduit, whereby the upper conduit is coaxially aligned with said longitudinal axis;
    a lower swivel joint member rotatably coupled to said upper swivel joint member about a plane of rotation, said plane of rotation being disposed at an angle of between zero degrees (0°) and thirty degrees (30°) with respect to said longitudinal axis of said upper conduit receptacle of said upper swivel joint member; and
    a locking mechanism coupling said upper swivel joint member to said lower swivel joint member, said locking mechanism permitting rotation between said upper and lower swivel joint members and being selectively tightenable to lock said upper swivel joint member to said lower swivel joint member, thereby preventing rotation therebetween, wherein said locking mechanism comprises a locking bolt centrally coupling said upper swivel joint member to said lower swivel joint member, said locking bolt defining a centerline of rotation between said upper and lower swivel joint members and being selectively tightenable to lock said upper swivel joint member to said lower swivel joint member, thereby preventing rotation therebetween, and
    wherein each of said upper and lower swivel joint members includes an internal sleeve for receiving said locking bolt, said sleeve of said upper swivel joint member making annular contact with said sleeve of said lower swivel joint member to prevent over tightening of said locking bolt.

16. A lighting fixture swivel joint for pivoting an upper conduit having a fixture head disposed at an upper end thereof downward with respect to a lower conduit, the swivel joint comprising:
    an upper swivel joint member having an upper conduit receptacle defined by a longitudinal axis, said upper conduit receptacle being adapted to receive a lower end of the upper conduit, whereby the upper conduit is coaxially aligned with said longitudinal axis; and
    a lower swivel joint member rotatably coupled to said upper swivel joint member about a plane of rotation, said plane of rotation being disposed at an angle of between zero degrees (0°) and thirty degrees (30°) with respect to said longitudinal axis of said upper conduit receptacle of said upper swivel joint member,
    wherein one of said upper and lower swivel joint members includes a stop block fixed thereto and the other of said upper and lower swivel joint members includes a mechanical stop disposed thereon, said stop block making contact with said mechanical stop upon rotation of said upper swivel joint member to prevent further rotation.

* * * * *